United States Patent
Park

(10) Patent No.: US 8,558,692 B2
(45) Date of Patent: Oct. 15, 2013

(54) TAG LOCATION GUIDING METHOD AND TAG LOCATION GUIDING SYSTEM FOR COMMUNICATION TERMINALS

(75) Inventor: Il Kwon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 12/286,336

(22) Filed: Sep. 30, 2008

(65) Prior Publication Data

US 2009/0121873 A1    May 14, 2009

(30) Foreign Application Priority Data

Nov. 14, 2007  (KR) .................. 10-2007-0115826

(51) Int. Cl.
*G08B 21/00*    (2006.01)
(52) U.S. Cl.
USPC ............... 340/539.13; 340/572.1; 340/10.1; 340/539.1; 340/539.11; 342/450; 701/517

(58) Field of Classification Search
USPC .............. 342/357.06, 357.15, 450; 701/517
See application file for complete search history.

(56) References Cited

U.S. PATENT DOCUMENTS

| | | | |
|---|---|---|---|
| 2005/0099291 A1* | 5/2005 | Landau | 340/539.13 |
| 2006/0226970 A1* | 10/2006 | Saga et al. | 340/506 |
| 2007/0001904 A1* | 1/2007 | Mendelson | 342/450 |
| 2007/0013519 A1* | 1/2007 | Chung et al. | 340/572.1 |
| 2008/0157970 A1* | 7/2008 | Single et al. | 340/572.1 |
| 2009/0043502 A1* | 2/2009 | Shaffer et al. | 701/213 |

* cited by examiner

*Primary Examiner* — Mohammad Ghayour
*Assistant Examiner* — Mark Rushing

(57) ABSTRACT

A tag location guiding method and a tag location guiding system for communication terminals that enable guiding of tag location during reception of tag information are disclosed. The tag location guiding method for communication terminals includes: recognizing, upon reception of tag information, a guide level set in correspondence to the tag information; and outputting, if previously set location guide data according to the recognized guide level is present, the set location guide data. Accordingly, a user of a communication terminal can accurately obtain a situation through location guide data.

19 Claims, 6 Drawing Sheets

TAG LOCATION GUIDING METHOD AND TAG LOCATION GUIDING SYSTEM FOR COMMUNICATION TERMINALS

CROSS-REFERENCE TO RELATED APPLICATION(S) AND CLAIM OF PRIORITY

The present application claims priority to an application entitled "TAG LOCATION GUIDING METHOD AND TAG LOCATION GUIDING SYSTEM FOR COMMUNICATION TERMINALS" filed in the Korean Intellectual Property Office on Nov. 14, 2007 and assigned Serial No. 2007-0115826, the contents of which are incorporated herein by reference.

TECHNICAL FIELD OF THE INVENTION

The present invention relates generally to a tag information using method and a tag information using system for communication terminals and, more particularly, to a tag location guiding method and a tag location guiding system for communication terminals that enable guiding of tag location during reception of tag information.

BACKGROUND OF THE INVENTION

Generally, in radio frequency identification (RFID) technology, a tag stores unique tag information and transmits tag information to a reader located within a distance range. In this case, a reader can decode tag information of a plurality of tags located within a radius range even if it does not make direct contact with the tags and also can decode information of moving tags. Accordingly, RFID technology using tags and readers is being applied to various fields such as parking management systems (PMS), record management systems (RMS), entrance control systems (ECS), intelligent transportation systems (ITS), integrated management systems (IMS), livestock identification systems (LIS), and factory automation systems (FAS).

However, a communication terminal to which a reader is mounted just manages tag information as a record. As a result, there exists a demand for a technology that enables wider application of RFID technology using RFID tags and readers.

SUMMARY OF THE INVENTION

To address the above-discussed deficiencies of the prior art, it is a primary object to provide a tag location guiding method for communication terminals comprising: recognizing, upon reception of a tag information, a guide level set to correspond to the tag information; and outputting, if previously set location guide data according to the recognized guide level is present, the set location guide data.

In accordance with another exemplary embodiment of the present invention, there is provided a tag location guiding system for communication terminals comprising: a tag storing a tag information; and a communication terminal having a reader unit for receiving the tag information, a control unit recognizing, upon reception of the tag information, a guide level corresponding to the received tag information and outputting, if previously set location guide data according to the recognized guide level is present, the set location guide data, and a memory having a tag setting database for storing the set location guide data for the tag information under the control of the control unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged tag location system.

In exemplary embodiments of the present invention, the term 'tag information' refers to information transmitted from tags. Tag information contains unique data stored in tags, such as identification codes, and areas where the tags are attached (i.e., titles of tag locations). Tag information may further contain vision data by which transmission of tag information from tags is carried out.

The term 'location guide data' refers to data that, upon reception of tag information from a tag, are output to guide location of the tag in a communication terminal. Such location guide data may be data for explaining the location of a tag or data warning approach to the location of the tag. Location guide data may be output as signals such as audio signals and text signals. The term 'location guide data' will be used in conjunction with the term 'notification data' for playback of a communication terminal and the term 'transmission data' for transmission from one communication terminal to another.

The term 'a guide level' refers to a level that, upon reception of tag information from a tag, is set to output specific location guide data according to a reference in a communication terminal. Then, a guide level may be classified according to a distance between a tag and a communication terminal receiving the tag information (i.e., a tag distance).

Figure 1:
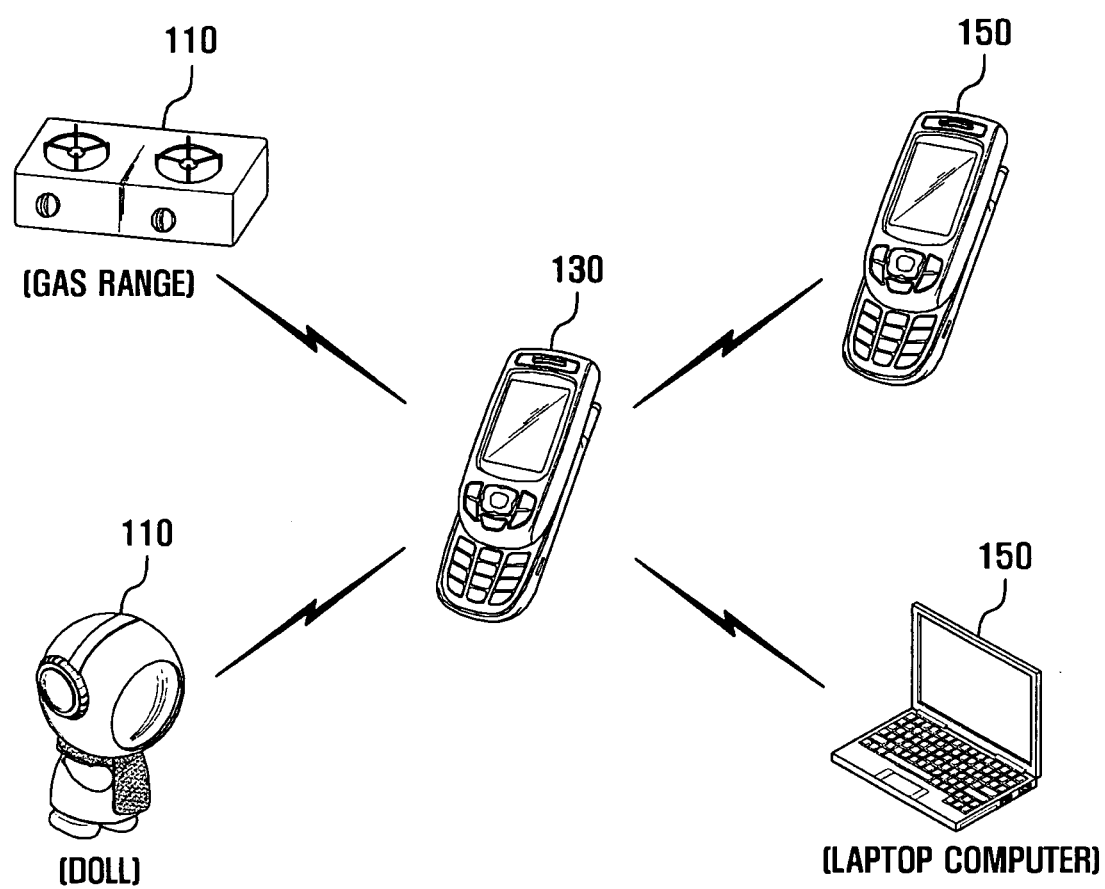
FIG. 1 is a view schematically illustrating a tag location guiding system for communication terminals according to an embodiment of the present invention.

FIG. 1 is a view schematically illustrating a tag location guiding system for communication terminals according to an embodiment of the present invention.

Referring to FIG. 1, the tag location guiding system includes at least one tag 110 and a first communication terminal 130. The tag location guiding system may include a second communication terminal 150.

The tag 110 stores and transmits tag information. The tag 110 is mounted to a specific tag location, such as a doll, a traffic sign, a home appliance, and an inner or outer wall of a building. The tag 110 may transmit tag information at a time interval. As an alternative, the tag 110 may transmit tag information in response to a demand.

The first communication terminal 130 includes a reader unit for receiving tag information. The first communication terminal 130 may transmit a message making a demand for tag information at a time interval. Upon reception of the tag information, the first communication terminal 130 may output location guide data. That is, the first communication terminal 130 may play back notification data or may transmit transmission data to the second communication terminal 150. Moreover, the first communication terminal 130 processes tag information.

Figure 2:
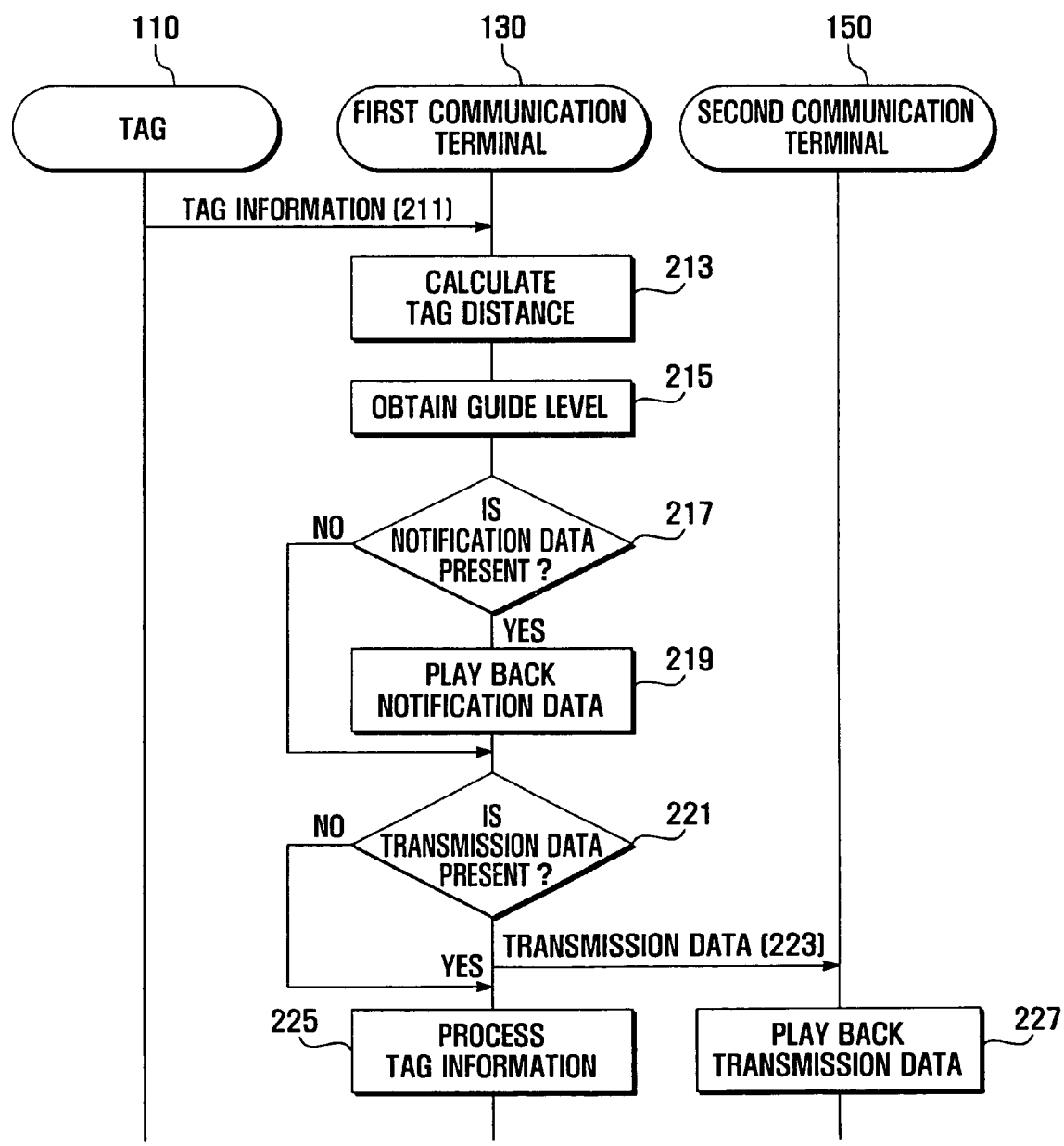
FIG. 2 is a flowchart illustrating a signal flow in a tag location guiding system for communication terminals according to an embodiment of the present invention.

FIG. 2 is a flowchart illustrating a signal flow in a tag location guiding system for communication terminals according to an embodiment of the present invention.

Referring to FIG. 2, the tag 110 transmits tag information in step 211. Then, the tag 110 may radiate tag information at a time interval. In addition, upon reception of a demand message from the first communication terminal 130, the tag 110 may transmit tag information to the first communication terminal 130.

Thereafter, upon reception of the tag information, the first communication terminal 130 calculates a tag distance using the tag information in step 213. The first communication terminal 130 recognizes a guide level preset to correspond to the tag distance in step 215. Thereafter, the first communication terminal 130 determines if previously set notification data corresponding to the guide level is present in step 217. Upon determination of the presence of the set notification data, the first communication terminal 130 plays back the set notification data in step 219. The first communication terminal 130 determines if previously set transmission data corresponding to the guide level is present in step 221. Upon determination of the presence of the set transmission data, the first communication terminal 130 transmits the set transmission data to the second communication terminal 150 in step 223. Meanwhile, the first communication terminal 130 processes tag information in step 225, regardless of the determination results of steps 217 and 221.

Upon reception of the transmission data, the second communication terminal 150 plays back the transmission data in step 227.

Figure 3:
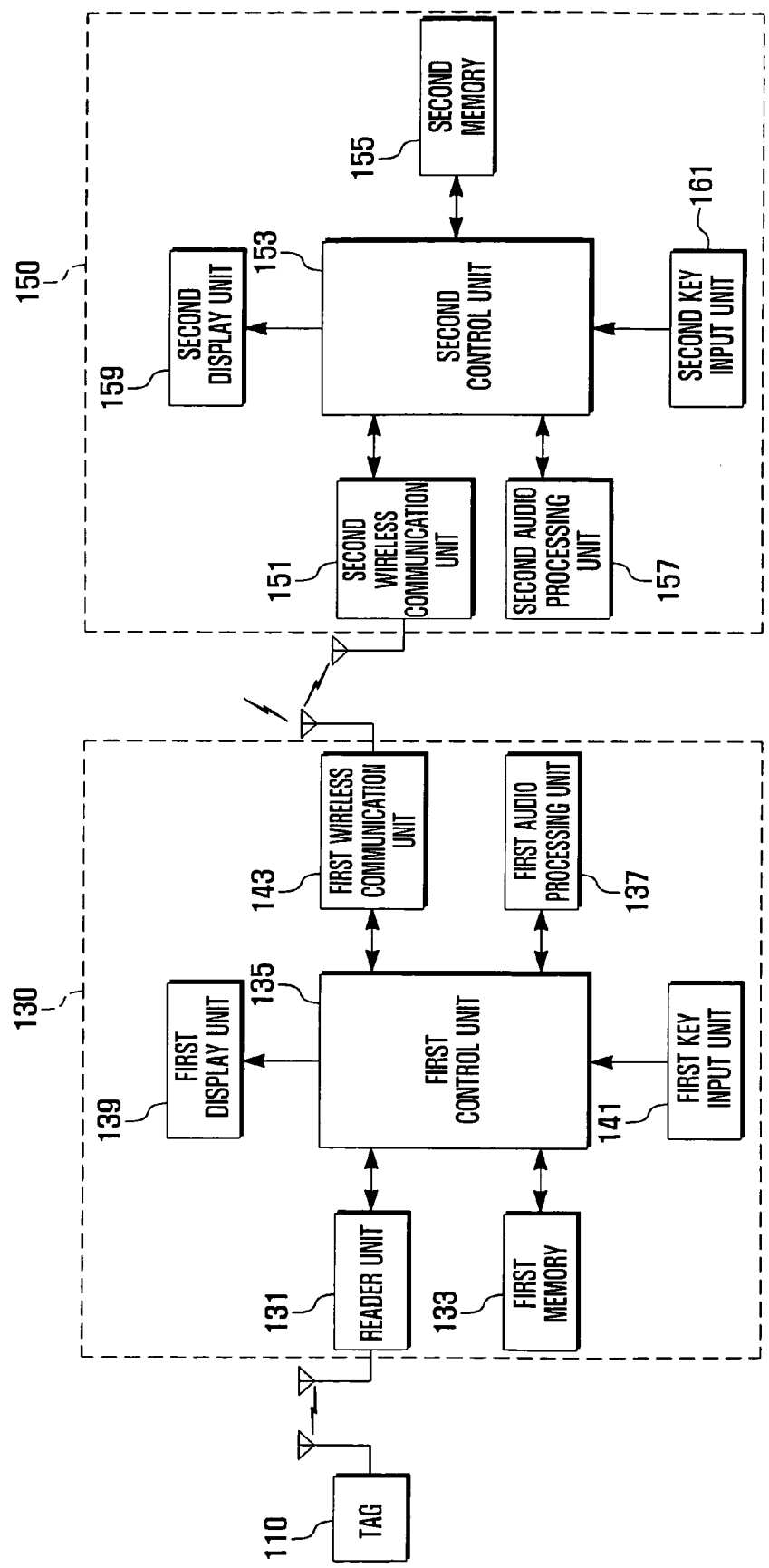
FIG. 3 is a block diagram illustrating a tag location guiding system for communication terminals according to an embodiment of the present invention.

FIG. 3 is a block diagram illustrating a tag location guiding system for communication terminals according to an embodiment of the present invention. In this embodiment of the present invention, it will be assumed that the first communication terminal 130 and the second communication terminal 150 are mobile phones.

Referring to FIG. 3, the tag 110 stores and transmits tag information. The tag 110 includes a tag memory storing tag information, a tag communicator for transmitting tag information, a tag controller controlling transmission of tag information at a time interval or to a specific target. The tag 110 may be fixed or may be moved on demand depending on its location.

The first communication terminal 130 includes a reader unit 131, a first memory 133, a first control unit 135, a first audio processing unit 137, a first display unit 139, a first key input unit 141, and a first wireless communication unit 143.

The reader unit 131 receives tag information from a plurality of tags within a readable distance. The reader unit 131 may transmit a demand message for tag information.

The first memory 133 may include a program memory and a data memory. The program memory may store an operating program of the first communication terminal 130 and programs for controlling guide of tag location. The program memory stores data occurring during execution of a program. The first memory 133 includes a tag setting database for storing location guide data set for respective tag information and a tag information database for storing records about reception of tag information.

The first control unit 135 controls the overall operation of the first communication terminal 130. The first control unit 135 includes a data processing unit having a transmitter encoding and modulating a transmitted signal and a receiver demodulating and decoding a received signal. In this case, the data processing unit may include a modem and a codec.

The first control unit 135 sets location guide data for at least two guide levels of tag information according to an embodiment of the present invention. Upon reception of tag information, the first control unit 135 determines a setting of the position guide data of tag information. Then, the first control unit recognizes a guide level from the tag information, and determines the existence of a location guide data set according to the recognized guide level. Upon setting the location guide data, the first control unit 135 outputs the set location guide data. In addition, the first control unit 135 processes tag information and stores the processed result in a tag information database.

The first audio processing unit 137 plays back a received audio signal output from an audio codec of the data processing unit through a speaker or transmits a transmitted audio signal generated in a microphone to an audio codec of the data processing unit. The first audio processing unit 137 plays back location guide data as an audio signal under the control of the first control unit 135.

The first display unit 139 displays user data output from the first control unit 135. The first display unit 139 may be an LCD, in which case it may include an LCD controller, a memory storing image data, and an LCD device. When the LCD is realized by a touch screen, it may be operated as an input unit. The first display unit 139 may play back location guide data as a text signal under the control of the first control unit 135.

The first key input unit 141 includes keys for input of numbers and letters and function keys for setting various functions.

The first wireless communication unit 143 carries out wireless communication in the first communication terminal 130. The first wireless communication unit 143 includes an RF transmitter raising the frequency of and amplifying a transmitted signal and an RF receiver low-noise amplifying and lowering the frequency of a received signal. In this case, the first wireless communication unit 143 may transmit location guide data under the control of the first control unit 135.

The second communication terminal 150 includes a second wireless communication unit 151, a second control unit 153, a second memory 155, a second audio processing unit 157, a second display unit 159, and a second key input unit 161. The elements of the second communication terminal 150 are similar to those corresponding elements of the first communication terminal 130, and the detailed description thereof will be omitted. However, the second communication terminal 150 does not include a reader unit 130.

In the second communication terminal 150, upon reception of location guide data, the second control unit 153 may play back the location guide data. That is, the second control unit 153 may play back location guide data through at least one of the second audio processing unit 157 and the second display unit 159. The second memory 155 may store records about reception of location guide data under the control of the second control unit 153.

Figure 4:
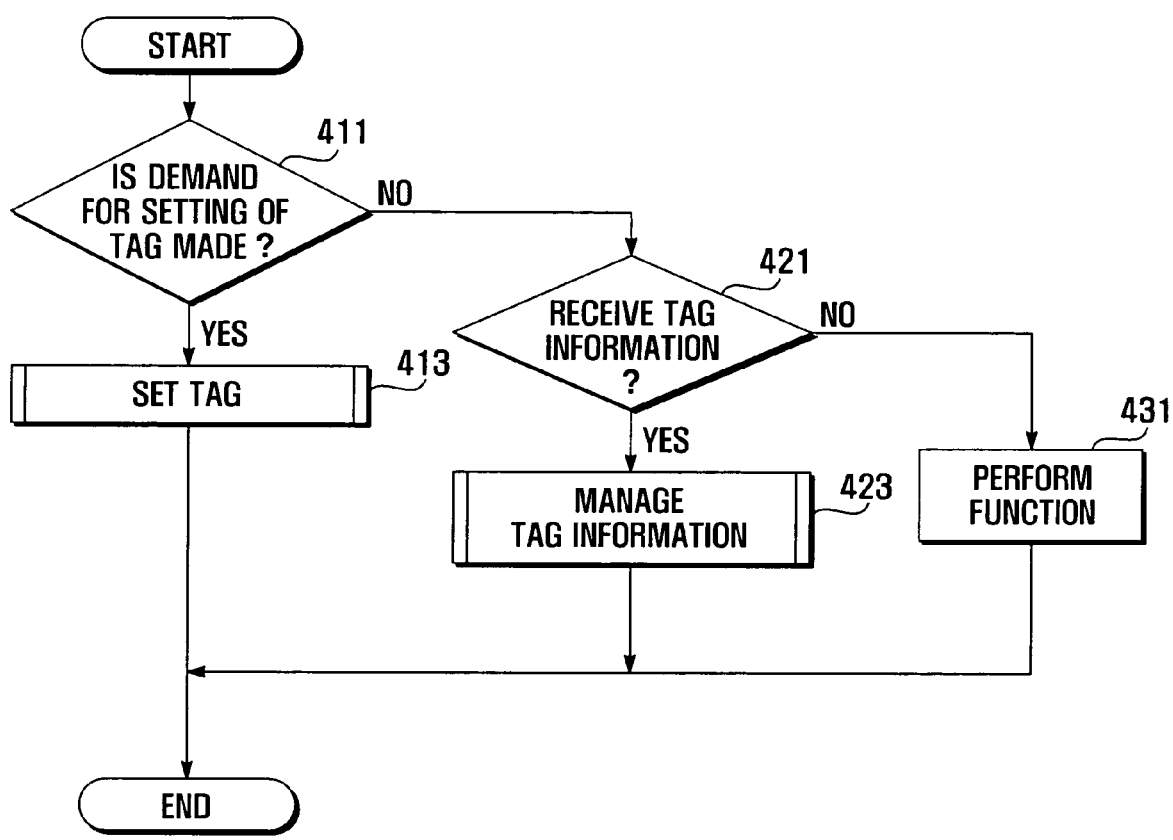
FIG. 4 is a flowchart illustrating a tag location guiding procedure of a communication terminal according to an embodiment of the present invention.

FIG. 4 is a flowchart illustrating a tag location guiding procedure of a communication terminal according to an embodiment of the present invention.

Referring to FIG. 4, in a tag location guiding procedure of a communication terminal according to an embodiment of the present invention, upon a demand for setting a tag, the first control unit 135 detects the demand in step 411, and carries out a tag setting procedure in step 413. Then, the first control unit 135 sets the location guide data to correspond to the tag information. A tag setting procedure carried out by the first control unit 135 will be described in detail with reference to FIG. 5.

Figure 5:
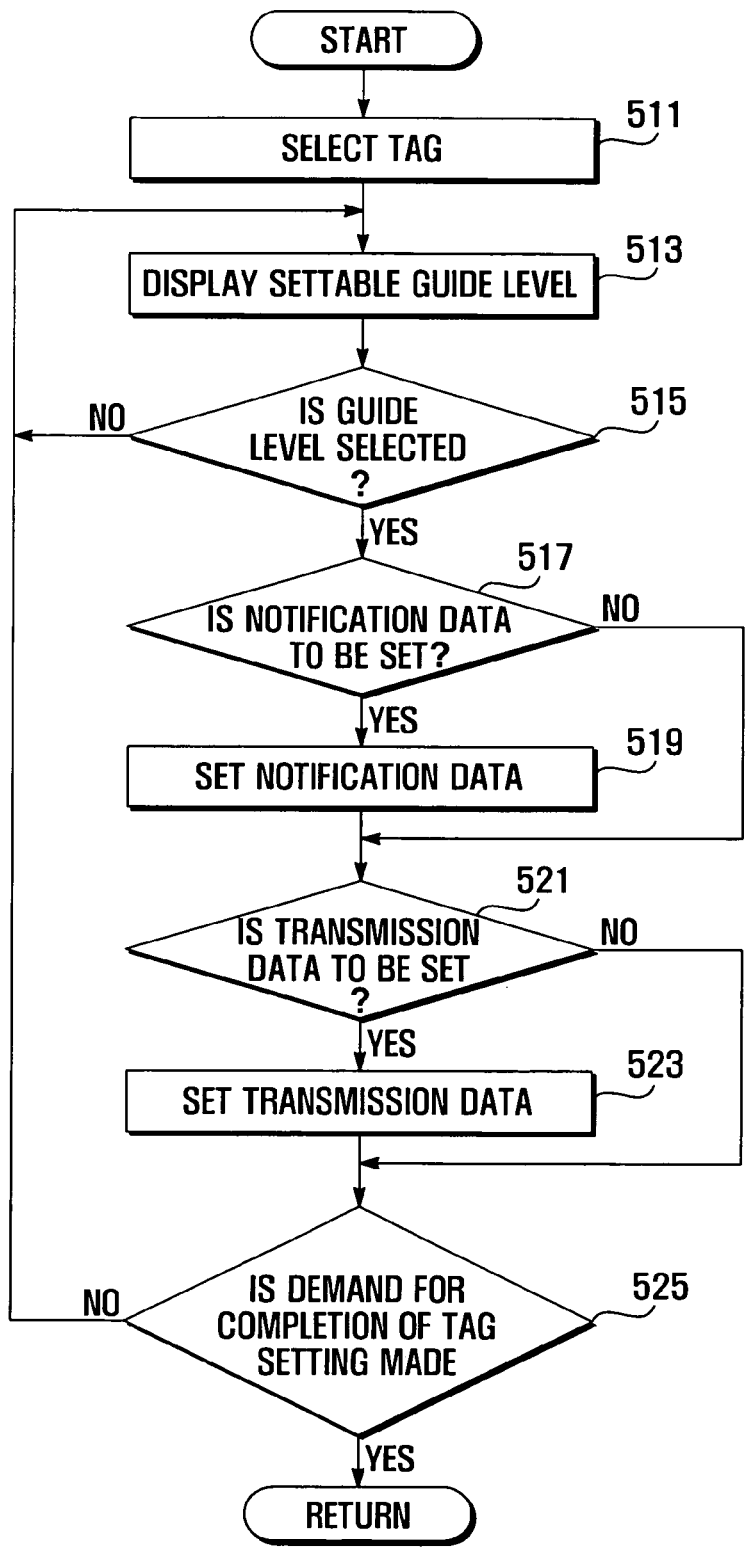
FIG. 5 is a flowchart illustrating a tag setting procedure of FIG. 4.

FIG. 5 is a flowchart illustrating a tag setting procedure of FIG. 4.

Referring to FIG. 5, the tag setting procedure according to an embodiment of the present invention starts with the selection of a tag by the first control unit 135 in step 511. For example, after the first control unit 135 receives tag information from a tag within a readable distance through the reader unit 131, the first control unit 135 may select a specific tag information. That is, the first control unit 135 may display a title of a tag location contained in a tag information in a list, and may select a specific tag information in response to a detected signal. The first control unit 135 displays a settable guide level in step 513. Then, the first control unit 135 may display a guide level classified according to a tag distance. Thereafter, upon selection of a specific guide level, the first control unit 135 detects the selected guide level in step 515 and determines a setting of the notification data that corresponds to tag information in step 517.

Thereafter, upon determination of the setting of the notification data in step 517, the first control unit 135 sets the notification data in step 519. Then, the first control unit 135 may record an audio signal generated in a microphone of the first audio processing unit 137, and may set the recorded audio signal as notification data. Alternatively, the first control unit 135 may set notification data using an audio signal previously stored. The first control unit 135 may set a text signal generated through a touch screen or the first key input unit 141 as the notification data. Alternatively, the first control unit 135 may set the notification data using a text signal previously stored.

Thereafter, the first control unit 135 determines a setting of the transmission data that corresponds to the tag information in step 521. That is, upon determination of a failure in the setting of the notification data in step 517, the first control unit 135 goes to step 521. Alternatively, upon the setting of the notification data in step 519, the first control unit 135 goes to step 521.

Then, upon determination of a setting of the transmission data in step 521, the first control unit 135 sets the transmission data in step 523. In this case, the first control unit 135 may set an identification number for communication with the second communication terminal 150. The first control unit 135 may record an audio signal generated in the microphone of the first audio processing unit 137 and may set the recorded audio signal as the transmission data. Alternatively, the first control unit 135 may set the transmission data using an audio signal previously stored. The first control unit 135 may set a text signal generated through a touch screen or the first key input unit 141 as the transmission data. Alternatively, the first control unit 135 may set the transmission data using a text signal previously stored.

Finally, upon a demand for the completion of the tag setting procedure, the first control unit 135 detects the demand in step 525, and after completion of the tag setting procedure, returns to FIG. 4. Then, upon a failure in the demand for the completion of the tag setting procedure, the first control unit 135 may repeat steps 513 to 525 until the first control unit 135 detects a demand for completion. Accordingly, the first control unit 135 may set multiple notification data or transmission data for respective guide levels in a specific tag information. Then, the tag setting database of the first memory 133 may store location guide data set for the respective tag information as in Table 1.

TABLE 1

| Tag Location | Identification Code | Guide Level | Notification Data | Transmission Data |
|---|---|---|---|---|
| Gas Range | 0x000010 | A | Be careful! | |
| | | B | It's hot. | 000-0000-0000 Approach Gas Range |
| Bear Doll | 0x00011 | A | It's a doll. | |
| — | — | — | — | — |
| — | — | — | — | — |

On the other hand, upon a failure in the demand for the setting of a tag in step 411 and the reception of a tag information, the first control unit 135 detects the tag information in step 421, and carries out a procedure of managing tag information in step 423. Then, the first control unit 135 outputs location guide data set that corresponds to specific tag information. The first control unit 135 processes the specific tag information. Hereinafter, a process of carrying out a procedure of managing tag information by the first control unit 135 will be described in detail with reference to FIG. 6.

Figure 6:
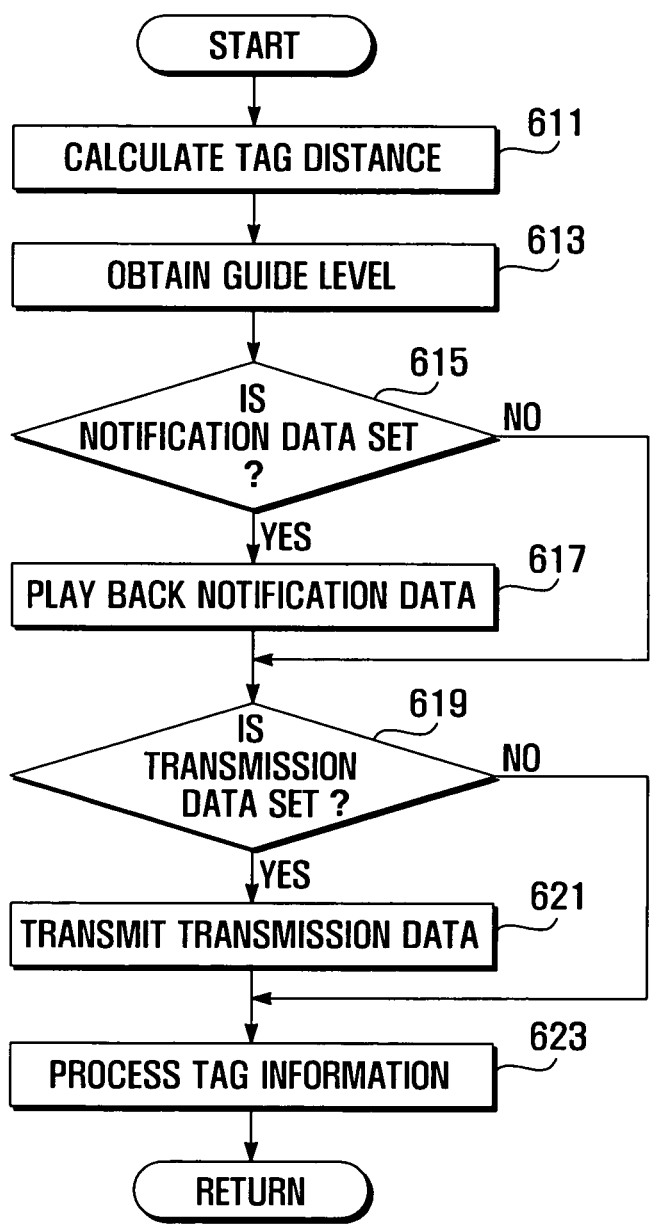
FIG. 6 is a flowchart illustrating a tag information managing procedure of FIG. 4.

FIG. 6 is a flowchart illustrating a tag information managing procedure of FIG. 4.

Referring to FIG. 6, the tag information managing procedure starts with the calculation of a tag distance by the first control unit 135 using the tag information in step 611. For example, the first control unit 135 may calculate a tag distance by comparing a transmission time and a reception time of the tag information. The first control unit 135 may calculate a tag distance according to the reception intensity of the tag information. Thereafter, the first control unit 135 recognizes a guide level for the calculated distance in step 613. The first control unit 135 determines if previously set notification data according to the recognized guide level is present in step 615.

Thereafter, upon determination of the presence of the set notification data in step 615, the first control unit 135 plays back the notification data in step 617. When the set notification data is an audio signal, the first control unit 135 plays back the set notification data through a speaker of the first audio processing unit 137. When the set notification data is a text signal, the first control unit 135 plays back the set notification data through the first display unit 139.

Then, the first control unit 135 determines if previously set transmission data according to the recognized guide level in a specific tag information is present in step 619. Upon determination of a failure in the presence of the set notification data in step 615, the control unit 135 goes to step 619. Alternatively, after playback of the set notification data in step 617, the first control unit 135 goes to step 619.

Upon determination of the presence of the set transmission data in step 619, the first control unit 135 transmits the set transmission data in step 621. In this case, the first control unit 135 may transmit the set transmission data to the second communication terminal 150 using a set identification number for communication.

Finally, the first control unit 135 processes tag information in step 623, and returns to FIG. 4. That is, upon determination of a failure in the presence of the set transmission data in step 619, the first control unit 135 goes to step 623. Alternatively, after transmitting the set transmission data in step 621, the first control unit 135 goes to step 623. For example, the first control unit 135 may count the number of repetitions of a specific tag information and may store it in the tag information database of the memory 130. That is, the first control unit 135 may arrange the tag information using the number of repetitions. In this case, the first control unit 135 may calculate a preference and a preference time for a specific tag location from the counted number of repetitions. The first control unit 135 may store the preference and the preference time in the tag information data base. Meanwhile, the first control unit 135 may process tag information for a set time period (example.g., in units of predetermined time periods). That is, the first control unit 135 may classify the processed results of the tag information according to a set time period to store them. Then, the tag information database of the first memory 133 stores the processed results of tag information as in Table 2.

TABLE 2

| Tag Location | Identification Code | Number of Repetitions | Preference | Preference time | Number of Repetitions of Preference time |
|---|---|---|---|---|---|
| Bear Doll | 0x000011 | 8 | 1 | 14:00~15:00 | 3 |
| Gamer | 0x000015 | 5 | 2 | 17:00~18:00 | 2 |
| Robot | 0x000012 | 3 | 3 | 11:00~12:00 | 2 |
| Soccer Ball | 0x000017 | 2 | 4 | 15:00~16:00 | 2 |
| — | — | — | — | — | — |
| — | — | — | — | — | — |

On the other hand, upon a failure in the detection of the tag information in step 421, the first control unit 135 may perform a specific function in step 431. For example, the first control unit 135 displays the processed result of the tag information stored in the tag information database through the first display unit 139 or may transmit it to the second communication terminal 150.

In the above-mentioned embodiment of the present invention, an example of, outputting location guide data set to correspond to the tag information whenever the tag information is received has been described, but the present invention is not limited thereto. For example, upon reception of the same tag information within a set time period, the output of the location guide data may not be repeated. On the other hand, upon reception of the same tag information again after a lapse of a set time period, the output of the location guide data may be repeated.

According to the present invention, upon reception of a tag information, a communication terminal processes the tag information and manages the tag information as a record, and outputs a location guide data set corresponding to the tag information. Then, the communication terminal sets the location guide data for a plurality of guide levels in a single tag information, and outputs the location guide data corresponding to a specific guide level according to an area. Therefore, a user of a communication terminal can accurately access an area through the location guide data.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A tag location guiding method for a communication terminal comprising:
receiving, at the communication terminal, tag information for identifying a tag, the communication terminal storing at least one of a plurality of guide level data classified corresponding to a plurality of distances between the communication terminal and the tag, and a plurality of location guide data for explaining a location of the tag corresponding to each of the guide level data, the location guide data comprising textual information or audio information associated with an item on which the tag is mounted;
determining, at the communication terminal, one of the guide level data corresponding to the tag information by calculating the distance from the communication terminal to the tag;
outputting, at the communication terminal, the location guide data corresponding to the determined guide level data; and
transmitting, at the communication terminal, transmission data corresponding to the determined guide level to at least one other communication terminal.

2. The tag location guiding method of claim 1, further comprising setting the location guide data according to each of the guide level data corresponding to the tag information.

3. The tag location guiding method of claim 1, further comprising processing the tag information.

4. The tag location guiding method of claim 1, wherein outputting the set location guide data comprises playing on a speaker or displaying on a display, at least one of the audio information or textual information, respectively.

5. The tag location guiding method of claim 1, wherein outputting the set location guide data comprises transmitting the transmission data to at least one other communicating terminal.

6. The tag location guiding method of claim 1, further comprising determining at the communication terminal, a preference level for each tag according to a received repetition rate from each tag.

7. The tag location guiding method of claim 1, further comprising transmitting the set location guide data to at least one other communication terminal.

8. The tag location guiding method of claim 1, wherein calculating the distance comprises measuring a tag distance by comparing a transmission time and a reception time of tag information or according to the reception intensity of the tag information.

9. A tag location guiding system for communication terminals comprising:
   a tag configured to store a tag information for identifying the tag; and
   a communication terminal comprising:
      a reader unit configured to receive the tag information;
      a memory configured to store at least one of a plurality of guide level data classified corresponding to a plurality of distances between the communication terminal and the tag and a plurality of location guide data for explaining a location of the tag corresponding to each of the guide level data, the location guide data comprising textual or audio information associated with an item on which the tag is mounted; and
      a control unit configured to determine, upon reception of the tag information, one of the guide level data corresponding to the received tag information by calculating the distance from the communication terminal to the tag, output the location guide data corresponding to the determined guide level data.

10. The tag location guiding system of claim 9, wherein the control unit is configured to set the location guide data according to each of the guide level data corresponding to the tag information and control the memory to store the set location guide data.

11. The tag location guiding system of claim 9, wherein the control unit is configured to process the received tag information and instruct the memory to store the processed result, and the memory further comprises a tag information database configured to store the processed result.

12. The tag location guiding system of claim 9, wherein the communication terminal further comprises a speaker configured to play the audio information using the location guide data.

13. The tag location guiding system of claim 9, wherein the communication terminal further comprises a display unit configured to display the textual information.

14. The tag location guiding system of claim 9, wherein the communication terminal further comprises a wireless communication unit configured to transmit the transmission data to at least one other communication terminal.

15. The tag location guiding system of claim 9, wherein the communication terminal is configured to determine a preference level for each tag according to a received repetition rate from each tag.

16. The tag location guiding system of claim 9, wherein the communication terminal is configured to transmit the transmission data to at least one other communication terminal.

17. Code embodied on a non-transitory computer-readable medium, when executed by at least one processor, configured to perform at least the following:
   receive, at a communication terminal, tag information for identifying a tag, the communication terminal storing a at least one of plurality of guide level data classified corresponding to a plurality of distances between the communication terminal and the tag, and a plurality of location guide data for explaining a location of the tag corresponding to each of the guide level data, the location guide data comprising textual or audio information associated with an item on which the tag is mounted;
   determine, at the communication terminal, one of the guide level data corresponding to the tag information by calculating the distance from the communication terminal to the tag;
   output, at the communication terminal, the location guide data corresponding to the determined guide level data.

18. The code of claim 17, further configured to set the location guide data according to each of the guide level data corresponding to the tag information.

19. The code of claim 17, further comprising processing the tag information.

* * * * *